United States Patent [19]

Kivimaa

[11] Patent Number: 4,621,669

[45] Date of Patent: Nov. 11, 1986

[54] PROCEDURE FOR PROLONGING TOOL LIFE IN WOOD CUTTING

[76] Inventor: Eero Kivimaa, Linnankoskenkatu 15, SF-02250 Helsinki 25, Finland

[21] Appl. No.: 652,825

[22] Filed: Sep. 20, 1984

[30] Foreign Application Priority Data

Sep. 26, 1983 [FI] Finland ............................ 833446

[51] Int. Cl.$^4$ .............................................. B27L 5/00
[52] U.S. Cl. ...................................... 144/365; 83/16; 83/171; 144/209 R; 361/233
[58] Field of Search .............. 144/162 R, 176, 209 R, 144/177, 178, 212, 213, 214, 365; 83/16, 171; 361/233

[56] References Cited

U.S. PATENT DOCUMENTS 855,389  5/1907  Dawkins ............................ 361/233
4,453,437  6/1984  Ask ..................................... 83/171

FOREIGN PATENT DOCUMENTS 27352  11/1954  Finland .

OTHER PUBLICATIONS

Kivimaa, E., "Cutting Force in Woodworking", Technical Research Centre of Finland, Helsinki, 1950, Publication No. 18, p. 102.
Kivimaa, E., "What is the Dulling of Woodworking Tools?" (English translation), Technical Research Centre of Finland, Helsinki, Bulletin 106, p. 19.
Kivimaa, E., "Was ist die Abstumpfung der Holzbearbeitungswerkzeuge?", Holz als Roh-und Werkstoff, 1952, 10:425–428.
McKenzie, W. M., and McCombe, B. M., "Corrosive Wear of Veneer Knives", Forest Products Journal, 1968, 18 (3): 45, 46.
Lutz, J. F., "Knife wear. Techniques for Peeling, Slicing and Drying Veneer", Forest Products Laboratory, USDA, Madison, Wisconsin, 1974, Paper No. 228:26.
Fleischer, H. O., and Downs, L. E., "Heating Veneer Logs Electrically", U.S. For. Prod. Lab, Rep. No. 1958, Madison, Wisconsin, 1958.
Voigt, H., Kirscher, O., and Strauss, H., "Soderverfahren der Holztrocknung", Holz als Roh-und Werkstoff, 1940, No. 11, 336–367.

Primary Examiner—W. D. Bray
Attorney, Agent, or Firm—Bucknam and Archer

[57] ABSTRACT

A procedure the life of wood-cutting tools and relates to the cutting of green wood and comparable organic materials. The dulling of tools in such cutting is mainly corrosion of the cutting edge of the tool, which could be almost completely prevented under laboratory conditions by applying a high-voltage direct current. The dulling is also limited in practice in the procedure, which is based on the realization of the specific resistance of wood which is sufficient to render unnecessary the electric insulation of the tool or the wood being cut from the frame of the cutting machine. Such an operation is difficult to carry out, but was formerly believed to be indispensable. The invention, the negative terminal of a DC source is connected with the grounded frame of the machine. The current is conducted from the positive terminal of the DC source, using a suitable anode brush, into green wood acting like an electrolyte at a point close to the tool that is to be protected. The wood-cutting tool, and on its side also the means for feeding and supporting the wood, will then act as cathodes in the system and they will be protected against wear caused by corrosion.

6 Claims, 2 Drawing Figures

PROCEDURE FOR PROLONGING TOOL LIFE IN WOOD CUTTING

BACKGROUND OF THE INVENTION

The object of the present invention is to limit the dulling of wood-cutting tools resulting from wear of their cutting edge. Retarded dulling, again, implies longer tool sharpening intervals and, at the same time, prolonged tool life. The invention only relates to limiting the "normal" wear of tools used in cutting green timber, and equivalent electrically conductive organic materials. Therefore, for instance the dulling caused by types of timber with exceedingly high mineral content or by sand adhering to the wood falls outside its scope.

At an earlier occasion, more than 30 years ago, the present applicant published results obtained in laboratory experiments demonstrating that it is possible in principle with the aid of electricity to limit the dulling of tools in green timber cutting. The present procedure emerges from the applicant's new realizations, enabling the above mentioned basic insight now to be utilized in practice as well, to the purpose of extending the tool life. The fundamental idea of the invention is stated in the claim, to which reference is made here.

In the following, to begin with, are described certain results of studies from tests carried out by the applicant himself, and results published by other authors. Next is presented the applicant's new realization, which provides a clear-cut theoretical foundation for the present procedure. The utilization of the procedure is illustrated by examples from practice and by laboratory tests. Finally, a biliography is given, listing the studies to which reference is made in the disclosure following below.

The applicant's doctors's thesis work carried out at the State Institute from Technical Research, Reference 1, was fundamental for the present invention, in that a simple, yet high accurate, cutting force measuring means was developed in its connection. In conjunction with this work, the dulling of tools was already subjected to preliminary study, the increment of the main cutting force, measured under standardized conditions at regular intervals, being used as a sensitive index for the "wear", or dulling of the tool's cutting edge. The actual studies of dulling were made feasible by this method of research.

The applicant's next study, References 2a and 2b, aimed at clarification of the basic character of the dulling phenomenon. It led to the hypothesis that the wear of the tool's cutting edge is, partly at least, an electrochemical corrosion process. This theory was proved correct by laboratory studies of green wood cutting. In these tests, one terminal of a source of DC was connected to the machine frame, and thereby to the green wood being cut, and the other terminal was over a carbon brush connected to the cutter head, electrically insulated from the machine. When the knife was connected, over the rotating cutter head, with the positive and the green wood with the negative terminal and the DC source had a voltage of 1500 V, the dulling of the knife was accelerated by a factor of about 5. Inverting the poles resulted in reduction of dulling to about $\frac{1}{8}$; in some instances the dulling came to an end nearly altogether. In both instances the dulling of the knife without application of electricity served as control.

Reference 2c is a patent, obtained in the name of the applicant's employer at that time, the State Institute for Technical Research, applied for in Finland only, and which could not be utilized in practice. Its essential contents have been set forth in the preamble to the main claim of this application. One study also revealed that the dulling went down to about 1/5 with 500 V.

The last mentioned study, as well as certain continued tests by the present applicant under practical conditions, yielded further confirmation of the theory that has been presented concerning the fundamental nature of tool dulling. However, practical applications turned out to be rather more inconvenient than had been expected, due to the high voltage and to the difficulties experienced in insulating, with adequate safety, the cutting tools or the wood being cut. In fact, the major result of the studies, from the practical point of view, was the idea expressed by the applicant in the last run: that the service life of tools should be extended by paying particular attention in their manufacturing to the corrosion resistance of their materials.

The findings of References 2 soon became internationally well-known, in particular through the paper of Reference 2b, which was published in German. It is believed that the tungsten-carbide industry was quickest in utilizing the results of study by producing carbide brands well appropriate for use in cutting green wood also; this had not been successfully solved before the basic character of the dulling phenomenon had been elucidated.

However, numerous researchers were intrigued by direct application of electricity in wood cutting in actual practice. References 3 and 4 represent two authoritative attempts at solving the problem.

In Reference 3, the internationally renowned authority on wood cutting, McKenzie, reports on veneer peeling trials made virtually under conditions of actual practice, at the Australian Forest Products Laboratory, Melbourne. Two parallel test peelings were performed in this study. The timber to be peeled consisted of 81 cm diameter ash discs with a length of 12 cm, veneer thickness of about 1 mm, and a total of 975 m of veneer being peeled in both cases. One trial peeling was performed conventionally, without electricity. In the parallel test, a voltage of 60 V was applied between the knife and nosebar, which were electrically insulated from the machine frame. The wear suffered by the cutting edge was measured on the front surface of the short test knife, with a measuring microscope, three times in each of the two trials. The result recorded in the test indicated that when the cutting knife of the veneer lathe was connected to the negative terminal of a DC source and the nosebar to the positive terminal, the wear of the knife's cutting edge was only 40% of what it was when no electricity was applied. An embarrassing secondary effect observed in the test was spark-over of electricity between the knife and the nosebar edge through the sap flow expressed from both ends of the bolt. During spark-over, a current of about 80 mA was measured, while the current was only 10 mA when there was no spark-over. McKenzie observes, regarding the economic significance, that if the reduced wear of knifes would enable the sharpening interval to be doubled in practice as well, this would imply no less than 50% saving both in the tool costs proper and in tool maintenance costs for these lathes.

In Reference 4, the well-known veneer manufacture researcher, Lutz, reports on similar trials at the U.S. Forest Products Laboratory, Madison, in peeling full-size, 1.2 m long oak bolts. The nosebar of the veneer lathe was connected to the positive terminal and the knife to the negative terminal of a DC source, the voltage being 300 V. In addition to reduced dulling, which was not measured on the full-size knife, a further object was to prevent the marring of the veneer by blue stain discolouring it, which adheres to the veneer when the lathe momentarily stops. This is an embarrassing phenomen in the peeling of several hardwood species, one of them oak, which was used in the tests. The observation was made as a results of the tests that the electric voltage greatly reduced the blue staining of the veneer, whereas the stain transferring to the veneer from the nosebar increased. In addition, the spark-over through the sap at the ends of the bolt, mentioned in connection with the preceding study, was so strong that the sparking caused an appreciable defect at this point on the knife edge.

Reference 3 and 4 confirm the result presented in the applicant's publications of Reference 2, concerning the fundamental nature of dulling in cutting green wood, and they emphasize even further the significance of using tool materials resistant to corrosion. On the other hand, the primary objective of the studies, that is direct utilizing of electricity towards limiting tool dulling in practice, was not attained in these studies.

The next two references, though not concerning wood-cutting, gave the applicant interesting additional understanding of the behavior of wood in an electrical field.

Reference 5 concerns trials carried out at the U.S. Forest Products Laboratory, in which large-sized veneer bolts were rapidly heated to peeling temperature, utilizing the electrical resistance of the wood. AC was used in these tests at voltages ranging from 1000 to 5000 V.

Reference 6 describes drying tests with small, green test specimens (diameter approximately 75 mm, length 40 to 70 mm) making use of the electrical resistance of the wood to heat the specimens. In these tests, both conventional AC and DC and voltages from 200 to 2000 V were used.

On the basis of the measurements it can be noted that the ohmic resistance of green wood is not greatly variable. For example, in fresh-cut pine with a water content of 125% calculated on the dry weight of wood, the resistance increases approximately by a factor of 3 as the water content falls to the wood fibers' saturation point which is considered to be the limit moisture content of "green wood". This limit moisture content is about 30% for pine. With further drying of the wood, the resistance goes up steeply. The resistance increases by a factor of 1 million when the water content decreases from the wood fiber saturation to 5%. In fact, dry wood is nearly as good an insulator as glass.

The main reason why attempts to curb the dulling of cutting tools have not yielded any results so far in instances of practical cutting is the difficult task of insulating the cutting tools, or the wood being cut, and the apprehension due to the risks involved with high voltages. The actual solution of the problem was to be the present applicant's realization that after all electrical insulating neither of the cutting tool nor of the wood from the frame of the cutting machine is necessary, because even green wood has a very high specific resistance compared with metals, on the order of $10^7$ times as high. This implies that the DC can simply be introduced with a brush contact operating as an anode, or by any other suitable contact, in the wood being cut, close to the tool that should be protected, this tool operating as a cathode.

Once this basic insight had been reached, it was simple to present also a clear-cut theoretical background for the invention. This background may be crystallized in three main points, as follows:

BRIEF SUMMARY OF THE INVENTION

1. Green wood is an electrolyte, the ions present in it serving as carriers of current exactly as they do in an aqueous solution in which an electric current is introduced. When the negative terminal of a DC source has been connected to the frame of the machine and the current is conducted from the positive terminal, using a suitable anode, into the green wood being cut, all the rest of the elements of the wood-cutting machine, which are interconnected and/or grounded, constitute cathodes in the system and will thereby be protected against corrosion, in part at least.

2. The electric currents obey both kirchhoff's and Ohm's law, also in green wood. Kirchhoff's law implies that the current introduced in the wood equals the sum of the currents branching off therefrom to different cathodes. The currents branching off from the anode to different cathodes are, in their turn, according to Ohm's law inversely proportional to the resistance lying between the anode and each cathode. Placing the anode as close as possible to the cutting tool (or tools) serving as the cathode, the greater part of the DC will be caused to flow through the green wood to the cutting edge. This is furthermore promoted by the efficient orientation of the field lines in the electric field exactly towards the sharp "points" of the tools which are to be protected. On the other hand, it is hardly detrimental that part of the electric current goes to wood feeding or clamping elements rather removed from the anode, since these will be partially protected at the same time. The internal resistance of green wood, for its part, is high enough to have the consequence that the current which has to be conducted to the anode is small, even if high voltage is used.

3. Since insulating neither of the wood being cut nor of the tools is absolutely necessary, the embodiments of the procedure of the invention are simple and safe. With the negative pole of the DC source connected to the grounded frame of the machine, the anode brush, made of metal or of another first-class conductor, connected to the positive pole of the current source will be the sole point to be guarded on account of electric voltage. Its proper protection involves no major difficulties. The wood being cut into which the current is conducted with the anode, being a second-class conductor with high resistance, is not dangerous. Moreover, the wood is "grounded" by the cathodes which cut it or move it. As a result, it is possible with safety to use DC voltages of about 300 to 500 V, which is a voltage protecting the tools fairly efficiently against dulling.

As will be evident from the foregoing, practical application of the new procedure when cutting green wood will no longer cause any difficulties. In spite of this, the procedure will be illustrated in the following with the aid of an embodiment, relating to veneer peeling.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
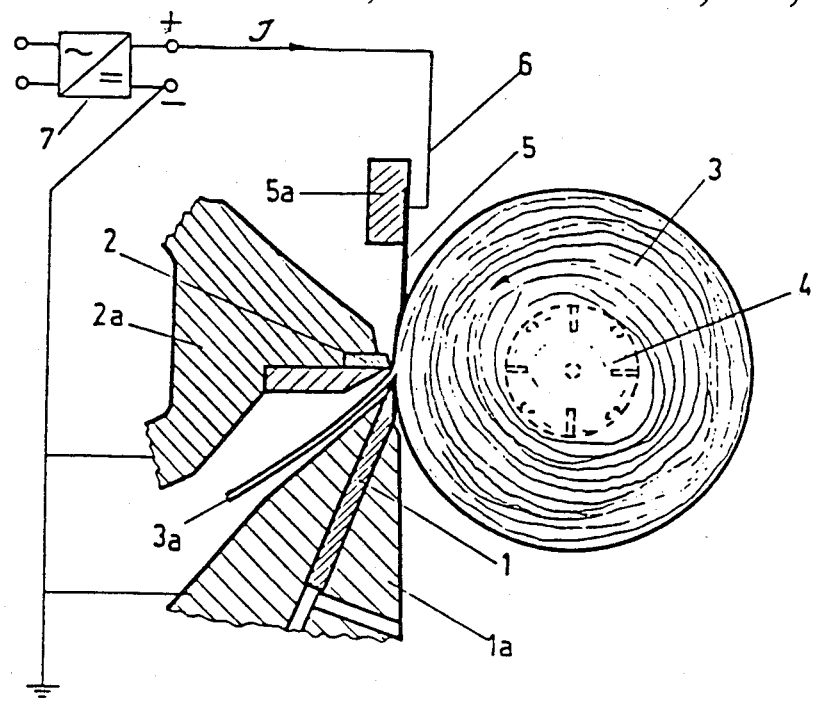
FIG. 1 is a schematic cross-sectional view of the veneer peeling, illustrating an embodiment of the apparatus of the invention for prolonging tool life in woodcutting.
Figure 2:
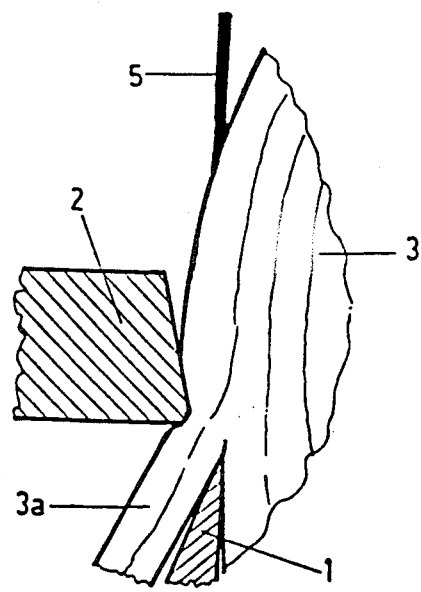
FIG. 2 is a cross-sectional view, on an enlarged scale, of the most important detail of FIG. 1.

In FIG. 1, the knife 1 of a veneer lathe is mounted on a tool holer beam 1a. The nosebar 2 of the lathe and the nose bar beam 2a are shown in FIG. 1. The veneer billet 3 to be peeled and the veneer 3a detached therefrom are also shown in FIG. 1. The veneer billet 3 is fixed between two mandrels setting it in rotation in the direction indicated by arrows. One of the mandrels 4 is shown in broken lines. An anode brush 5 parallels the knife 1. In this case, the brush 5 is made of a metal spring, mounted on an anode beam 5a made of insulating material, such as, for example, reinforced plastics. Current I is conducted from the positive terminal of the current source, in this case, a rectifier 7, via an electrical conductor 6, with the aid of the anode 5 to the billet being peeled. The negative terminal of the rectifier is connected to the grounded frame of the lathe. FIG. 2 shows in greater detail how the veneer 3a is detached between the knife 1 and the nosebar 2 from the billet 3, which is given a positive electric potential by the anode 5.

The total current I branches from the anode 5 to four cathodes. The current $I_1$ flows to the knife. The current $I_2$ flows to the nosebar 2. The current $I_4$ flows to the two mandrels 4. From Kirchhoff's law we derive the equation:

$$I = I_1 + I_2 + 2I_4$$

All these currents and the corresponding resistances can be easily measured and on the basis of the results, the final design and location of the anode can be determined.

If the design illustrated in FIGS. 1 and 2 is compared with the above mentioned veneer peeling tests carried out at the Australian Forest Products Laboratory (3) and the U.S. Forest Products Laborarory (4), it can be observed that with the procedure of the invention, the following decisive advantages are gained.

There is no need for electrical insulation of the lathe knife 1 and the nosebar 2 from the machine frame, which is difficult to carry out.

No spark-over through the sap flow will occur between the knife 1 and the nosebar 2, because there is no potential difference between them. This enables a higher voltage, providing better protection against corrosion, to be used than that used by McKenzie (3), in whose experiments spark-over was highly disadvantageous already at 60 V.

The knife 1 as well as the nosebar 2 are both protected. Precautions against electric shock are simple.

The foregoing advantages of the invention enable the utilization of the principle of corrosion protection, presented by the applicant more than 30 years ago.

Further examples of other applications of the procedure of the invention for cutting of green wood are presented hereinafter.

In veneer slicing, the principle is the same as in peeling.

In sawing logs or blocks with a band, frame or circular saw, it is expedient to employ an anode brush parallelling the blade and disposed at or slightly before the tooth line of the blade, and from which the current will be conducted to the points of the cutting teeth. Naturally, a plurality of anode brushes placed on different sides before the blade assembly and connected in parallel may equally well be used.

Although the invention has not yet been applied under mill conditions, preliminary tests performed in the laboratory confirm that the design of the invention presented here operates completely as expected.

As shown in FIG. 1a laboratory lathe was used to peel short spruce discs at room temperature under the following conditions. Initial diameter of the disc 3, 33 cm, length 6 cm and thickness of the veneer 3a mm. The diameter of the mandrels 4 was 10 cm. The anode brush 5 was of 1 mm sheet steel and lightly urged against the disc 3, its point of contact was located 17 mm over the knife 1.

The following observations were made in the tests.

1. When the knife 1 and the nosebar 2 had been lifted off from contact with the disc 3 for measurement purposes, the current going from the anode brush to the two mandrels 4 at a voltage of 200 to 300 V totalled only on the order of 10 mA.

2. While peeling was in progress, it seemed as if the entire current input from the anode 5 was going to the knife 1 and to the nosebar 2 and as if it was approximately equally divided between them, and it varied, calculated per cm breadth of the knifes 1 and 2, within the range 1~3 to 5 mA/cm. When similar tests were made with birch discs (veneer thickness 0.3 mm) at 400 V, the current intensity was considerably more uniform, presumably due to the more uniform distribution of moisture in birch wood, and its magnitude was 1~4 mA/cm.

In the last-mentioned case, the current going to the knife 1 itself, 1~2 mA/cm, is more than twice the current in the above-described tests of McKenzie (3), where the current going from the nosebar to the knife was 10 mA per 12 cm peeling breadth, or 1~0.8 mA/cm, and this current already reduced the tool wear by 60%. carpenter's band saw having a spring-set blade having a thickness of 0.8 mm and tooth pitch of 6 mm, on a green spruce beam with an 80 mm thickness, 13 teeth cutting wood simultaneously (80:6). The anode brush pressed against the side of the beam and the voltage was 300 V in these tests.

The current conducted from the anode to the 13 simultaneously cutting teeth varied between 5 and 8 mA, thus averaging 0.5 mA per one tooth with a 0.8 mm cutting width. For a swaged circular blade tooth with a swaged set breadth of 4 mm, for example the corresponding current intensity would in likelihood have been approximately 2.5 mA. It was furthermore noted that the position of the anode with reference to the blade, that is, longitudinally to the timber, had no marked effect on the current intensity, nor was any great influence noted from the distance of the anode, this distance varying between 2 and 8 cm in the tests.

As regards the economical significance of the procedure of the invention, McKenzie's (3) calculations have already been mentioned. Even at a conservative estimate, the studies carried out so far suggest that in a considerable number of wood-cutting instances, in practical work, the sharpening interval and the tool life could be extended to be threefold at least. This would, in its turn, imply major savings economically.

On the other hand, as regards the apparatus investments necessitated by the procedure and the continuous demand of electricity, the preliminary calculations and tests carried out so far suggest that these costs will be exceedingly low. In veneer peeling, for example, the power input can be estimated to range from 300 to 1000 W per 1 m lathe breadth and in the processing of sawn timber, from 10 to 30 W per each cutting blade of the sawing machine.

Finally, it should be observed that although the most significant application of the present invention is the cutting of green wood, one should include in its scope the processing with cutting tools of any organic materials behaving like an electrolyte in an electric field.

While the invention has been described by means of a specific example and in a specific embodiment, I do not wish to be limited thereto, for obvious modifications will occur to those skilled in the art without departing from the spirit and scope of the invention.

REFERENCES

1. Kivimaa, E. 1950. Cutting Force in Woodworking. Technical Research Centre of Finland, Helsinki, Publication No. 18, 102 p.

2a. Kivimaa E. 1952. Mitä on punntyöstöterien tylsyminen. English summary: What is the Dulling of Woodworking Tools? Technical Research Centre of Finland, Helsinki, Bulletin 106, 19 p.

2b. Kivimaa E. 1952. Was ist die Abstumpfung der Halzbearbeitungswerkzeuge? Holz als Roh- und Werkstoff 10:425–28.

2c. Finnish No. 27352. Procedure for Limiting the Dulling of Tools. Valtion Teknillinen Tutkimuslaitos. Patent Application filed Apr. 9, 1952, patent granted Nov. 11, 1954. Inventor: Kivimaa, E.

3. McKenzie, W. M., and McCombe B. M. 1968. Corrosive Wear of Veneer Knives. Forest Products Journal 18 (3): 45, 46.

4. Lutz, J. F. 1974. Knife Wear. Techniques for Peeling, Slicing and Drying Veneer. Forest Products Laboratory, USDA, Madison Wis. Paper No. 228:26

5. Fleischer, H. O., and Downs, L. E. 1953. Heating Veneer Logs Electrically. U.S. For. Prod. Lab. Rep. No. 1958, Madison Wis.

6. Voigt, H., Kirscher, O. and Strauss, H. Soderverfahren der Holtztrocknung. Holz als Roh- und Werkstoff No. 11 1940: 336–367.

What is claimed is:

1. A method for prolonging the service life of a wood-cutting machine when cutting green wood and comparable organic substances by limiting the dulling of the cutting component of the machine by electricity, said machine having a frame and said cutting component, said cutting component of said machine having a cutting edge and a cutting point, said method comprising conducting a direct current from a source which has a positive and a negative terminal through green wood being cut and through the cutting point of the cutting edge of the cutting component in a direction through the green wood being cut, said green wood acting like an electrolyte, of the said of said direct current to the wood being cut over a contact, letting said direct current flow through said cutting component of said wood-cutting machine and other components of said wood-cutting machine and connecting the negative terminal of the said source of direct current to said frame of said wood-cutting machine and wherein said contact acts as the anode and said other components of said machine function as the cathode.

2. A method as claimed in claim 1, wherein said direct current is applied at a voltage of about 300 to 500 volts.

3. Apparatus for prolonging the service life of a wood-cutting machine when cutting green wood and comparable organic substances by limiting the dulling of the cutting component of the machine by electricity, said machine having a frame and a cutting component mounted thereon, said cutting component of said machine having a cutting edge and a cutting point, said apparatus comprising a direct current source having a positive terminal and a negative terminal;

conducting means electrically connecting the negative terminal of said direct current source to said frame of said wood-cutting machine; and additional conducting means electrically connecting the positive terminal of said direct current source to the green wood being cut, whereby said green wood acts like an electrolyte, direct current from said direct current source flowing through said cutting component of said wood-cutting machine and other components of said machine.

4. Apparatus as claimed in claim 3, wherein direct current from said direct current source is applied at a voltage of about 300 to 500 volts.

5. Apparatus as claimed in claim 3, wherein said additional conducting means contacts said green wood and functions as the anode of the system and said other components of said machine function as cathodes of said system.

6. Apparatus as claimed in claim 5, wherein said other components are wood feeding means and guiding means.

* * * * *